(12) United States Patent
Holter et al.

(10) Patent No.: US 11,920,326 B2
(45) Date of Patent: Mar. 5, 2024

(54) SYSTEMS AND METHODS FOR DETERMINING CONTROL CAPABILITIES ON AN OFF-HIGHWAY VEHICLE

(71) Applicant: HUSCO International, Inc., Waukesha, WI (US)

(72) Inventors: Ben Holter, New Berlin, WI (US); Timothy Opperwall, West Allis, WI (US); Austin Sowinski, Waukesha, WI (US); Mike Fossell, Wauwatosa, WI (US)

(73) Assignee: HUSCO International, Inc., Waukesha, WI (US)

( * ) Notice: Subject to any disclaimer, the term of this patent is extended or adjusted under 35 U.S.C. 154(b) by 37 days.

(21) Appl. No.: 17/765,363

(22) PCT Filed: Sep. 30, 2020

(86) PCT No.: PCT/US2020/053658
§ 371 (c)(1),
(2) Date: Mar. 30, 2022

(87) PCT Pub. No.: WO2021/067517
PCT Pub. Date: Apr. 8, 2021

(65) Prior Publication Data
US 2022/0389686 A1 Dec. 8, 2022

Related U.S. Application Data

(60) Provisional application No. 62/908,590, filed on Sep. 30, 2019.

(51) Int. Cl.
*E02F 9/26* (2006.01)
*G05D 1/00* (2006.01)

(52) U.S. Cl.
CPC .......... *E02F 9/262* (2013.01); *G05D 1/0061* (2013.01); *G05D 2201/0202* (2013.01)

(58) Field of Classification Search
CPC .............. E02F 9/262; G05D 1/0061; G05D 2201/0202; G05B 23/0286
See application file for complete search history.

(56) References Cited

U.S. PATENT DOCUMENTS 6,150,932 A * 11/2000 Kenue .................... B60Q 9/008
340/904
6,226,902 B1 5/2001 Heyne
(Continued)

OTHER PUBLICATIONS

PCT International Search Report and Written Opinion, PCT/US2020/053658, dated Dec. 15, 2020, 12 pages.

*Primary Examiner* — Mussa A Shaawat
(74) *Attorney, Agent, or Firm* — Quarles & Brady LLP

(57) ABSTRACT

Systems and methods for controlling operation of an off-highway vehicle are provided. A control method includes receiving an input command that includes at least one of a manual input command and an automatic input command, determining if an operator attention level is at a first attention level, a second attention level, or a third attention level, generating at least one output parameter based on the determined operator attention level and the input command, generating an output command based on the at least one output parameter, and outputting the output command to the first work function to control operation of the first work function based on the output command.

20 Claims, 5 Drawing Sheets

(56) References Cited

U.S. PATENT DOCUMENTS

| | | | |
|---|---|---|---|
| 6,239,707 B1* | 5/2001 | Park | G08B 21/06 |
| | | | 340/576 |
| 6,353,396 B1* | 3/2002 | Atlas | G08B 21/06 |
| | | | 340/576 |
| 6,393,348 B1* | 5/2002 | Ziegler | B60N 2/2821 |
| | | | 701/45 |
| 6,614,469 B1* | 9/2003 | Kato | G05D 1/0246 |
| | | | 348/148 |
| 7,138,922 B2* | 11/2006 | Strumolo | G08B 21/06 |
| | | | 340/576 |
| 7,222,690 B2* | 5/2007 | Isaji | B60K 28/066 |
| | | | 340/576 |
| 7,652,583 B2* | 1/2010 | Sanchez | B60K 28/066 |
| | | | 340/576 |
| 9,523,984 B1* | 12/2016 | Herbach | B60W 10/18 |
| 9,904,287 B1* | 2/2018 | Kuffner, Jr. | B60R 1/00 |
| 10,875,537 B1* | 12/2020 | Brooks | G06V 20/597 |
| 2008/0291032 A1* | 11/2008 | Prokhorov | B64D 11/0015 |
| | | | 340/576 |
| 2012/0224060 A1* | 9/2012 | Gurevich | G06V 20/58 |
| | | | 348/148 |
| 2017/0240096 A1* | 8/2017 | Ross | G05D 1/0212 |
| 2017/0277182 A1* | 9/2017 | May | B60W 50/082 |
| 2018/0105184 A1* | 4/2018 | Urano | B60W 30/09 |
| 2018/0196427 A1* | 7/2018 | Majumdar | B60W 40/09 |
| 2019/0049955 A1* | 2/2019 | Yabuuchi | A61B 5/1128 |
| 2019/0087148 A1 | 3/2019 | Goel et al. | |
| 2019/0184898 A1* | 6/2019 | Zheng | B60W 50/14 |
| 2019/0187701 A1* | 6/2019 | Zheng | B60W 50/14 |
| 2019/0243361 A1* | 8/2019 | Yabuuchi | B60W 60/0053 |
| 2019/0278268 A1* | 9/2019 | Rezaeian | G05D 1/0061 |
| 2019/0310629 A1* | 10/2019 | Taveira | G05D 1/0011 |
| 2019/0310630 A1* | 10/2019 | Taveira | G05D 1/0011 |
| 2020/0183383 A1* | 6/2020 | Stent | G06F 3/013 |
| 2020/0231182 A1* | 7/2020 | Oba | B60W 40/09 |
| 2020/0239007 A1* | 7/2020 | Sobhany | B60W 50/14 |
| 2020/0307646 A1* | 10/2020 | Kato | B60K 28/06 |
| 2020/0310418 A1* | 10/2020 | Kanoh | B62D 15/0285 |

* cited by examiner

SYSTEMS AND METHODS FOR DETERMINING CONTROL CAPABILITIES ON AN OFF-HIGHWAY VEHICLE

CROSS-REFERENCES TO RELATED APPLICATIONS

This application represents the U.S. national stage entry of International Application No. PCT/US2020/053658 filed Sep. 30, 2020, which claims priority to U.S. Provisional Patent Application No. 62/908,590, filed on Sep. 30, 2019, both of which are incorporated herein by reference in their entirety.

STATEMENT REGARDING FEDERALLY SPONSORED RESEARCH

Not Applicable.

BACKGROUND

Conventional hydraulic machines (e.g., off-highway vehicles and mobile machines) may include one or more functions that can be commanded to perform a task.

BRIEF SUMMARY

In some aspects, the present disclosure provides a method of controlling operation of an off-highway vehicle having a first work function. The method includes receiving an input command that includes at least one of a manual input command and an automatic input command, determining if an operator attention level is at a first attention level, a second attention level, or a third attention level, generating at least one output parameter based on the determined operator attention level and the input command, generating an output command based on the at least one output parameter, and outputting the output command to the first work function to control operation of the first work function based on the output command. The at least one output parameter includes at least one of a function speed of the first work function, a range of movement of the first work function, a rate of change of the output command, an enable/disable function flag, and a ratio between a manual output command and an automatic output command in the output command.

In some aspects, the present disclosure provides a method of controlling operation of an off-highway vehicle having a first work function. The method includes receiving an input command that includes at least one of a manual input command and an automatic input command, determining if an operator attention level is at a first attention, level, a second attention level, or a third attention level, determining a task requirement associated with a task being performed by the off-highway vehicle, generating at least one output parameter based on the determined operator attention level, the determined task requirement, and the input command, generating an output command based on the at least one output parameter, and outputting the output command to the first work function to control operation of the first work function based on the output command. The task requirement includes at least one of a precision level and a safety level. The at least one output parameter includes at least one of a function speed of the first work function, a range of movement of the first work function, a rate of change of the output command, an enable/disable function flag, and a ratio between a manual output command and an automatic output command in the output command.

The foregoing and other aspects and advantages of the disclosure will appear from the following description. In the description, reference is made to the accompanying drawings which form a part hereof and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
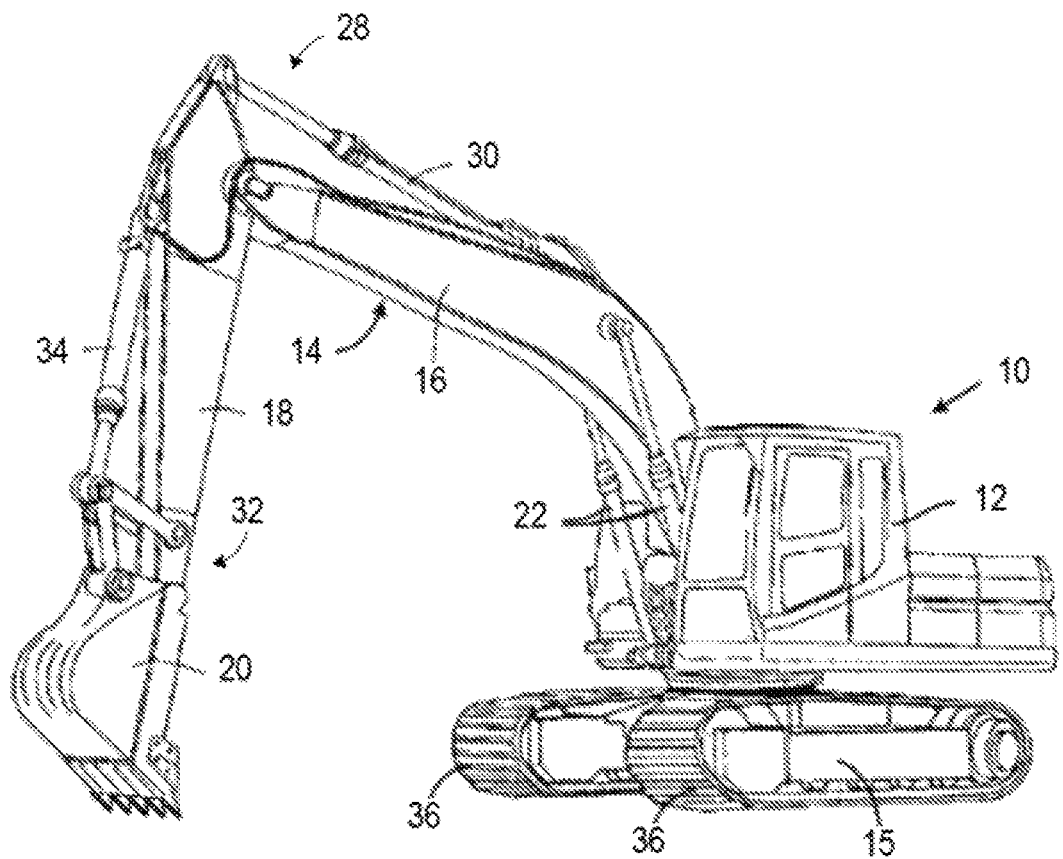
FIG. 1 is a perspective view of an off-highway vehicle according to one aspect of the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected" "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

Generally, conventional control systems on off-highway vehicles may include a safety system that is implemented with an emergency stop (E-stop) to cease operation of the off-highway vehicle, which results in the only options for operation being allow operations or stop all operations. In some conventional control systems, operator-based operation is always allowed, but an E-stop may be used for computer-controlled operations (e.g., commands that are generated solely by a controller without a manual operator input or commands that are generated to supplement a manual operator input). In any case, the options for managing computer-controller operations (e.g., augmented or automatic operations) in conventional off-highway vehicles are limited.

In general, the components on an off-highway vehicle that may displace, rotate, or otherwise effect movement of some portion of the off-highway vehicle to perform a task may be referred to herein as "work functions." The work functions on an off-highway vehicle may be operated in response to an output command that is supplied to the work function in response to an input command. In some non-limiting examples, the input command may include at least one of a manual input command and an automatic input command. In some non-limiting examples, the manual input command may be generated in response to one or more joysticks, or another operator-manipulated component, being manipulated by an operator of the off-highway vehicle. In some non-limiting examples, the automatic input commands may be generated by an on-board controller or a remote controller. In some non-limiting examples, an automatic input command may be generated to supplement a manual input command. For example, an automatic input command may modify, add to, or subtract from a manual input command. In some non-limiting examples, an automatic input command may be generated independently from a manual input command (e.g., the automatic input command may be generated without operator input).

The input commands may be converted into output commands that are supplied to the work functions. Several output parameters may be considered when converting the input commands to output commands. For example, function speed, range of movement, rate of change of the output command, an enable/disable function flag, and a ratio between a manual output command and an automatic output command in the output command may be considered during the generation of the output commands. In some non-limiting examples, the output commands may be in the form of electrical currents provided to one or more electrohydraulic valves or one or more electric motors that govern operation of the work functions.

With off-highway vehicles being integrated with increasing augments, automatic, and autonomous capabilities, there is a need for determining which augmentation or automatic work functions, or parts of work functions, can be allowed to operate for a particular level of operator attention and/or for a particular task being performed. This disclosure provides systems and methods that enable efficient operation of an off-highway vehicle by identifying an operator attention level and/or a task requirement, and determining how to manage manual and automatic commands based on the operator attention level and/or the task requirement, or determine which parts of manual and automatic commands are allowed based on the operator attention level and/or the task requirement. Output commands may be generated that correspond with the determined and/or task requirements. Depending on the determined and/or the task requirements, the output commands may allow unrestricted operation of the work functions or may modify manual operation, automatic operation, or both manual operation and automatic operation. In this way, for example, the various options for operation provided by the integration of automatic operations in an off-highway vehicle may be efficiently managed and better human/machine integration may be provided as off-highway vehicles become more and more automated and as task precision and safety requirement become more stringent.

The use of the terms "automatic," "automatic command," "automatic input command," "automatic output command," "computer-generated command," and variations thereof are not limited to commands that only originate without manual input from an operator. These terms also apply to commands that are generated to augment manual input from an operator. For example, an automatic command may be used to augment a manual input command from an operator by smoothing, or modifying in any way, an output command that is generated based on the manual input command, or by limiting a range of movement based on electronic fencing (e-fencing) or geo-fencing.

FIG. 1 illustrates one non-limiting example of an off-highway vehicle 10 according to the present disclosure. In the illustrated non-limiting example, the off-highway vehicle 10 is in the form of an excavator. In other non-limiting examples, the off-highway vehicle 10 may be in the form of another earth moving machine, such as, a dozer, a motor grader, a wheel loader, a scraper, or a skid steer, among other configurations. The off-highway vehicle may include a cab 12 and a boom assembly 14. The cab 12 can swing clockwise and counter-clockwise on a crawler 15 in response to a swing function command sent to a bidirectional hydraulic swing motor (not shown). The boom assembly 14 can be attached to the cab 12 and can include a boom 16, an arm 18, and a bucket 20 pivotally attached to each other. One or more boom actuators 22 can be mechanically and hydraulically connected in parallel and can raise and lower the boom 16 with respect to the cab 12 in response to a boom function command. The arm 18 can be supported at a remote end 28 of the boom 16 and can pivot forward and backward using an arm actuator 30 in response to an arm function command. The bucket 20 can pivot at a tip 32 of the arm 18 when driven by a bucket actuator 34 in response to a bucket function command. In other embodiments, the bucket 20 may be replaced with other work implements known in the an.

The off-highway vehicle 10 can travel using left and right bidirectional travel motors (not shown) that can independently drive a pair of tracks 36 to propel the off-highway vehicle 10 over the ground. The commands to operate the various work functions (e.g., the boom 16, the arm 18, the bucket 20, the tracks 36, swing of the cab 12, etc.) of the off-highway vehicle 10 can be manually generated by an operator of the digging machine, for example, manipulating one or more joysticks, automatically generated by a control method (e.g., a computer-generated command), and/or generated by an augmented or semi-automatic control method (e.g., an operator manipulates one or more joysticks and computer-generated commands modify the commands provided by the manipulation of the one or more joysticks).

Figure 2:
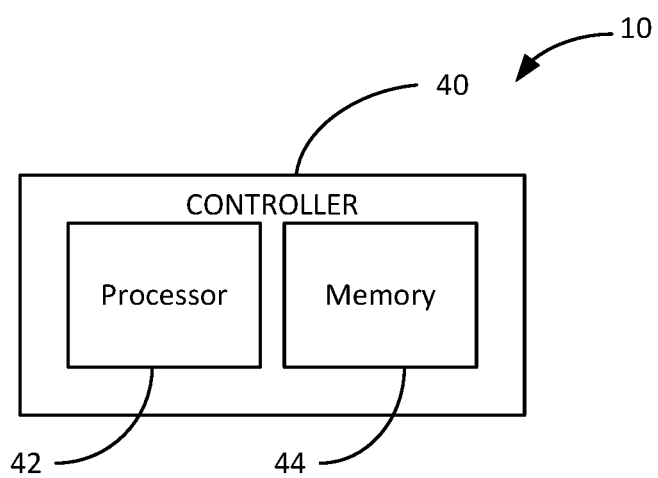
FIG. 2 is a block diagram of a controller of the off-highway vehicle of FIG. 1.

Turning to FIG. 2, the off-highway vehicle 10 may include a controller 40 in the form of a microcomputer-based device. The controller 40 may include a processor 42, which executes instructions of a control method, and memory 44 for storing the executable instructions and data (e.g., control maps) for the control method.

Figure 3:
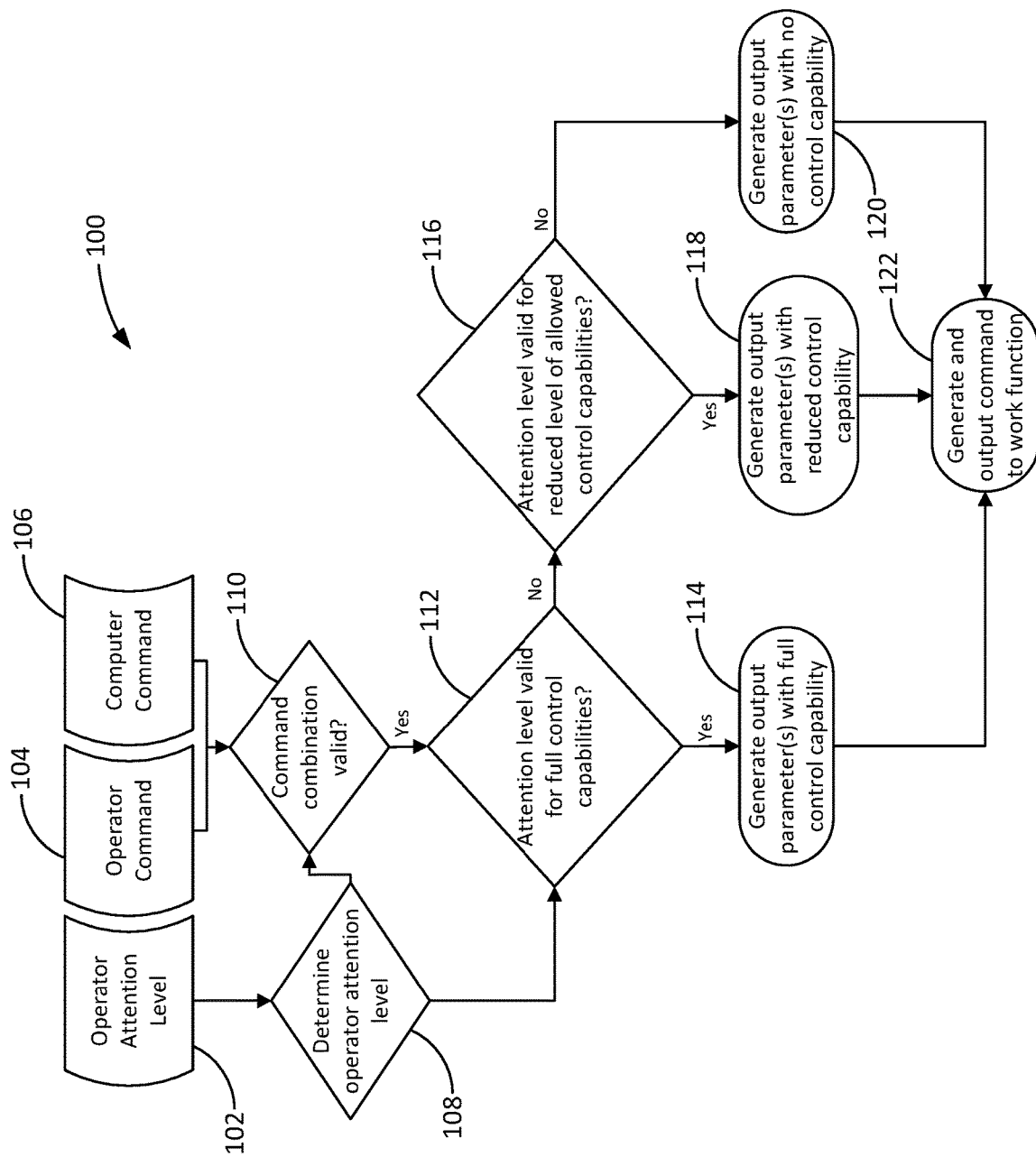
FIG. 3 is a block diagram illustrating a control method according to the present disclosure.

FIG. 3 illustrates one non-limiting example of a control method 100 for controlling operation of an off-highway vehicle according to the present disclosure. The control method 100 described herein may be, implemented on the controller 40 or a remote controller (e.g., a remote server in communication with the controller 40). In general, the control method may receive a plurality of inputs and, in response, generate one or more outputs to control operation of the work functions on an off-highway vehicle. In the illustrated non-limiting example, the control method 100 may receive an operator attention level input at block 102, an operator, or manual, input command at block 104, and a computer, or automatic, input command at block 106.

The operator attention level at block 102 may be sensed or detected by one or more sensors, one or more operator interfaces, and/or one or more external monitors. For example, the one or more sensors may include a camera configured to track an operator's eyes and eye movement (e.g., an operators focus of attention), smart glasses worn by an operator that are configured to detect a vision direction of an operator, a seat operator presence sensor, an operator heart rate sensor, or an implantable sensor that is configured to detect at least an operators focus of attention or eye direction/movement. In some non-limiting examples, one or more operator interfaces may include an operator's touch on one or more joysticks, a joystick-driven pilot pressure on one more work functions, a held down button or button on a timer, and voice prompts provided by the operator at predetermined time intervals during operation (e.g., CAPTCHA). In some non-limiting examples, the one or more external monitors may include an external observer or site manager, a GPS or another system locating where the off-highway vehicle is being used, a requirement to acknowledge detected nearby vehicles or persons on the worksite, a vehicle parameter (e.g., an operator is not responding to a stalled work function with high pressure or detecting that the vehicle is currently traveling), detecting a electronic device (e.g., a cell phone) is unlocked or phone calls are in progress.

In general, the above-described sensors, operator interfaces, and external monitors may be used alone or in combination to determine an operator attention level at block 108. The inclusion of more sensors, operator interfaces, and external monitors in the operator attention level determination block 108 provide better granularity in the operator attention level determination. In some non-limiting examples, some of the sensors, operator interfaces, and/or external monitors may be required in the operator attention level determination at block 108. For example, the detection of an operator in a seat or standing in an operator compartment (e.g., the cab 12) may be required to determine the operator attention level at block 108.

At block 108, the operator attention level may be determined to be at one of a plurality of operator attention levels. In some non-limiting examples, the operator attention level may be classified as a first attention level (e.g., low attention), a second attention level (e.g., medium attention), and a third attention level (e.g., high attention). In one non-limiting example, the first attention level may be defined by an operator being present in a seat of the off-highway vehicle (e.g., within the cab 12), not looking at the work function, and not touching a joystick. In one non-limiting example, the second attention level may be defined by an operator being present in the seat of the off-highway vehicle and touching one or more joysticks that are manually operating the work function, but not looking at the work function or not acknowledging the presence of a nearby obstacle. In one non-limiting example, the third attention level may be defined by an operation being present in the seat, manually operating joysticks or pressing down buttons, and looking at the work function being operated. It should be appreciated various other combinations of the sensors, operator interfaces, and external monitors may be used to define any number of operator attention levels. For example, the first, second, and third attention levels may not be discrete (e.g., the operator can only be in one of the first, second, or third attention levels) and can be continuous in operation. For example, a value of the operator attention level may be mapped to levels between the first, second, and third attention levels.

The operator attention level determination at block 108 may be continuously determined during implementation of the control method 100. In this way, for example, the control method 100 may detect if an operator changes their attention level during operation of the off-highway vehicle and the control method 100 may adapt the operation of the off-highway vehicle in response to the determined operator attention level. In some non-limiting examples, an operator may be given a predetermined amount of time after a change in the operation attention level is detected within which to reestablish the previous operator attention level. The operator may reestablish the previous operator attention level by providing haptic feedback to one or more of the joysticks, providing visual or audio feedback, returning vision focus to the work function being operated or pushing a button for confirmation. In some non-limiting examples, the control method 100 may alter the allowed operating parameters of one or more work functions substantially simultaneously with a detected change in the operator attention level.

With continued reference to FIG. 3, the manual input command at block 104 may be provided by an operator manipulating one or more joysticks on the off-highway vehicle, and the automatic input command at block 106 may be provided by a controller on the off-highway vehicle (e.g., the controller 40) or a remote controller. In general, an input command may be received by the control method 100, and the input command may include at least one of the manual input command at block 104 and the automatic input command at block 106. The manual input command at block 104 and the automatic input command at block 106 may be determined to be valid or invalid at block 110.

In some non-limiting examples, the manual input command may be determined to be incompatible with the automatic input command for a particular task being performed by the off-highway vehicle at block 110. For example, adding a manual input command to swing the cab 12 on the off-highway vehicle 10 or to initiate travel of the off-highway vehicle may be incompatible with an automatic input command that is generated as part of a digging or grading task being performed. In some non-limiting examples, if an added manual input command is determined to be incompatible at block 110, the incompatible manual input command may be disabled or the operator attention level may be used to determine if and when the added manual input command may be allowed. For example, the operator attention level determined at block 108 may be input to the valid command combination at block 110 and the determination at block 110 may require a predetermined operator attention level to determine that the command combination is valid. In some non-limiting examples, a command combination may be initially determined to be incompatible at block 110, and then the operator may be required to obtain a predetermined operator attention level, for example, by requiring the operator to look in a particular direction or at a particular work function, or by acknowledging an obstacle's presence, before determining that the command combination is valid at block 110.

In some non-limiting examples, the manual input command may be determined to be compatible with or valid for the automatic input command for a particular task being performed by the off-highway vehicle at block 110. For example, an operator may provide a manual input command for the arm 18 on the off-highway vehicle 10 that is compatible in direction and magnitude with an automatic input command or control of the boom 16 and the bucket 20 for a particular task being performed by the off-highway vehicle 10 to arrive at a compatible or valid combination of commands at block 110.

If the combination of input commands at block 110 is valid, then the determined attention level at block 108 may be used to determine at block 112 if the determined attention level is valid for full control capabilities. In some non-limiting examples, if the determined operator attention level at block 108 is at the third attention level, then it may be determined art block 112 that operator attention level qualifies for full control capabilities. In some non-limiting examples, if the determined operator attention level at block 108 is greater than the second attention level, then it may be determined at block 112 that the operator attention level qualifies for full control capabilities. If the operator attention level is valid for full control capabilities at block 112, then an output parameter may be generated with full control capability at block 114.

In some non-limiting examples, the output parameter generated at block 114 may include at least one of a function speed of a work function, a range of movement of a work function, a rate of change of an output command, an enable/disable function flag, and a ratio between a manual input command and an automatic input command in the output command. For example, if the output parameter generated at block 114 includes function speed and range of movement, the output parameter for the one or more work functions that are being commanded by the input command may be set to a maximum allowable speed and/or a maximum allowable range of motion. Alternatively or additionally, if the automatic input command is intended to augment or modify the manual input command, the output parameter generated at block 114 may allow for a maximum amount of automatic operation relative to the manual operation by modifying or controlling the output command based on the ratio between the manual input command and the automatic input command generated in the output parameter at block 114. In some non-limiting examples, the output parameter generated at block 114 may be greater than the input command. For example, an automatic input command may be greater than a manual input command when the off-highway vehicle is being automatically or augmented during a grading task. In some non-limiting examples, the output parameter generated at block 114 may by limited to a first parameter level that limits the output command to be less than or equal to the greater of the input command and the output parameter generated at block 114.

If the operator attention level is not valid for full control capabilities at block 112, then it may be determined at block 116 if the operator attention level is valid for a reduced level of allowed control capabilities. In some non-limiting examples, if the determined operator attention level at block 108 is less than the third attention level, then it may be determined at block 116 that the operator attention level is valid for reduced control capabilities. In some non-limiting examples, if the determined operator attention level at block 108 is less than the second attention level, then it may be determined at block 116 that the operator attention level is valid for reduced control capabilities, lithe operator attention level is valid for reduced control capabilities at block 116, then an output parameter may be generated with limited or reduced control capability at block 118. The output parameter generated at block 118 may include at least one of a function speed of a work function, a range of movement of a work function, a rate of change of an output command, an enable/disable function flag, and a ratio between a manual input command and an automatic input command in the output command.

Figure 4:
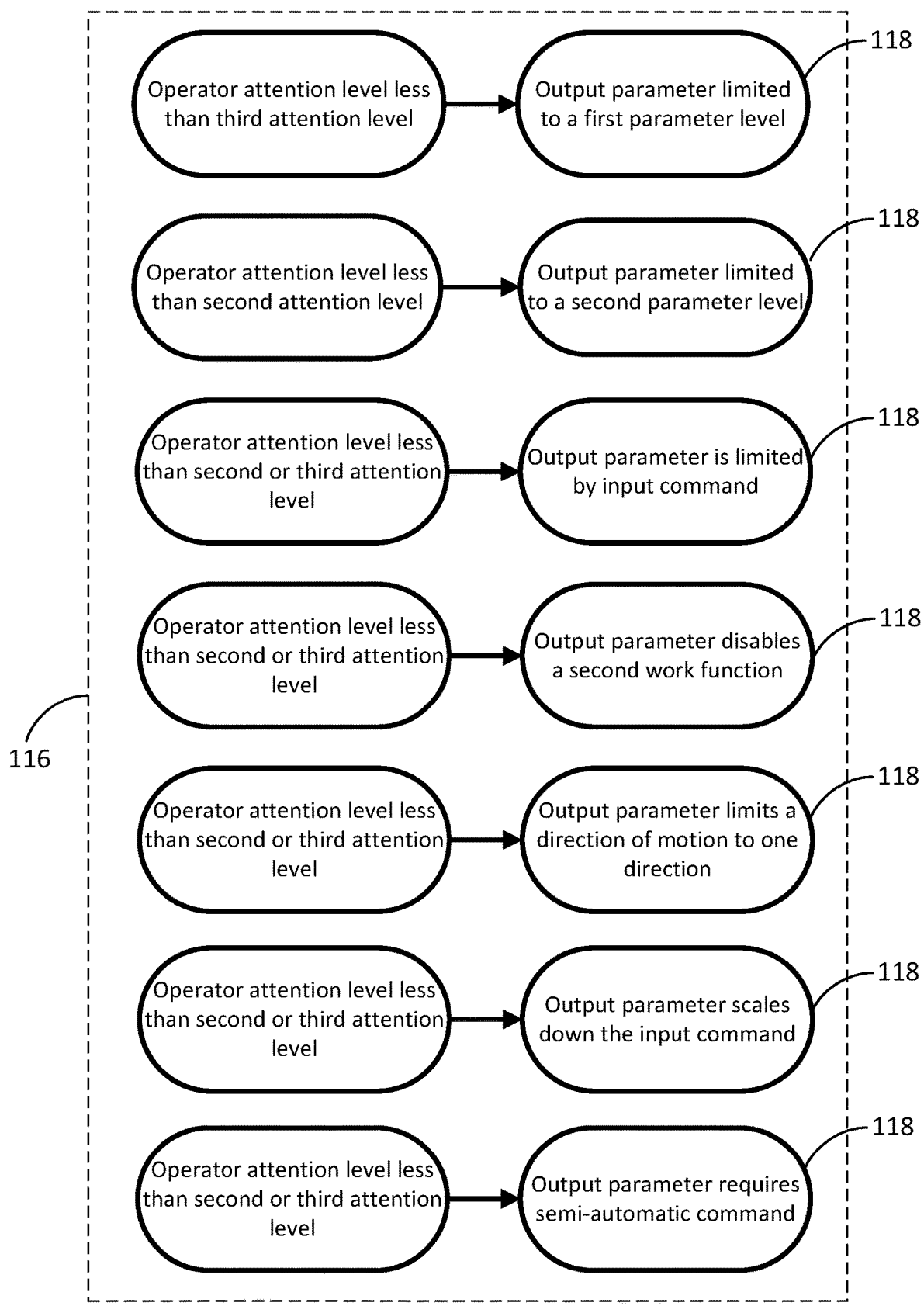
FIG. 4 is a block diagram illustrating various output commands from the control method of FIG. 3.

FIG. 4 illustrates various non-limiting examples of the determination at block 116 for various operator attention levels and the corresponding output parameter generated at block 118. In some non-limiting examples, if the determined operator attention level at block 108 is less than the third attention level, then, the at least one output parameter generated at block 118 may be limited to a first parameter level. The first parameter level may be a predetermined amount or range of amounts below or above the maximum manual and/or automatic capabilities of the off-highway vehicle for a particular work function. In some non-limiting examples, if the determined operator attention level at block 108 is less than the second attention level, then the at least one output parameter generated at block 118 may be limited to a second parameter level. The second parameter level may be different than the first parameter level. In some non-limiting, examples, the first parameter level may impose greater restrictions on the generated output parameter at block 118 than the second parameter level. In this way, for example, the amount of automatic operation allowed by a particular work function may be limited based on the operator attention level.

In some non-limiting examples, if the determined operator attention level of block 108 is less than the second attention level or the third attention level, the output parameter may be limited by the input command at block 118. For example, if the manual input command is requesting that a first work function move at a first function speed, then the output parameter may be limited to the first function speed. Similarly, if the automatic input command is requesting that a first work function move at a first function speed, then the output parameter will be limited to the first function speed. In some non-limiting examples, the output parameter may be limited to the lesser of a speed defined by the manual input command and a speed defined by the automatic input command.

As described herein, the off-highway vehicle may include multiple work functions. In some non-limiting examples, if the determined operator attention level of block 108 is less than the second attention level or the third attention level, the control capabilities of a first work function may be reduced and the output parameter may set the enable/disable function flag of a second work function to disable at block 118, which disables the second work function. For example, a swing of the cab 12 of the off-highway vehicle 10 may be disabled on the off-highway vehicle during automatic or augmented input commands that aid in a grading task if the operator attention level is at or below a predetermined operator attention level. But, other functions that are participating in the grading operation, for example, the boom 16, the arm 18, and or the bucket 20, may continue to be allowed automatic input and output commands.

In some non-limiting examples, if the determined operator attention level is less than the second attention level or the third attention level, the output parameter generated at block 118 may limit a range, of motion of a first work function to move in one direction. In this way, for example, the first work function may be forced to return to a safe/neutral position but with an operator still in control.

In some non-limiting examples, if the determined operator attention level of block 108 is less than the second attention level or the third attention level, the output parameter generated at block 118 may scale down the input command. For example, full range of motion on a joystick of the off-highway vehicle may correspond with 0-100% speed for a first work function. The output parameter generated at block 118 may scale this input command, for example, to a reduced range between 0% and 90%, or between 0% and 80%, or between 0% and 70%, or between 0% and 60%, or between 0% and 50%, or between 0% and 40%, or between 0% and 30%, or between 0% and 20%, or between 0% and 10%. A similar scale reduction may occur in other output parameters, separately or simultaneously, depending on the work function(s) being commanded.

In some non-limiting examples, if the determined operator attention level of block 108 is less than the second attention level or the third attention level, the output parameter generated at block 118 may scale down the input command. For example, a work function that includes an automatic input command, either in addition to a manual command or without a corresponding manual input command, may require semi-automatic operation by requiring an operator speed input, an active function command, and/or joystick movement to continue automatic operation.

It should be appreciated that the various determinations at block 116 and corresponding output parameters generated at block 118 illustrated in FIG. 4 are not mutually exclusive and may occur simultaneously or sequentially with one another depending on the work function(s) being commanded and the corresponding operator attention level. For example, the output parameter may be limited to the first predetermined level, the second predetermined level, the input command, or any of the other limitations described herein and one or more functions on an off-highway vehicle may be disabled based on a particular operator attention level for a particular task being performed by the off-highway vehicle.

With reference back to FIG. 3, if the determined attention level at block 108 is determined in block 116 to be not valid for reduced control capabilities, then an output parameter with no control capability (e.g., function is disabled or cannot be moved manually or automatically) may be generated at block 120. Once the at least one output parameter is generated at block 114, block 118, or block 120, an output command may be generated at block 122 that is based on the at least one output parameter. It should be appreciated that the generated output parameter may not be of the same type as the input command. For example, the input command may be for a function speed or position, and the output parameter generated at block 114, block 118, or block 120 may be for a range of motion, or a rate of comment, or another parameter described herein. Relationships can be mapped between the various types of input commands and the generated output parameters to, in turn, generate a particular output command.

In some non-limiting examples, the output parameter generated at block 114, block 118, or block 120 may result in a generated output command at block 122 that is less than the input command. In some non-limiting examples, the output parameter generated at block 114, block 118, or block 120 may result in a generated output command at block 122 may be limited to a first predetermined level. The first predetermined level may be greater than or less than the input command. In some non-limiting examples, the first parameter level may limit the output command generated at block 122 to be less than or equal to the greater of the input command and the output parameter. In some non-limiting examples, the output parameter generated at block 114, block 118, or block. 120 may limit the output command generated at block 122 to be less than or equal to a first predetermined level above or below the input command.

In some non-limiting examples, the output command generated at block 122 may be of the same type as the input command (e.g., input speed/position command results in an output speed/position command) with the control method 100 determining the allowed operations of the off-highway vehicle and reflecting those determinations in the generated output command at block 122. Once generated, the output command generated at block 122 may be output to a work function to control operation of the work function based on the output command. In this way, for example, the control method 100 provide various control capabilities for manual and automatic operation of one or more work functions on an off-highway vehicle.

The control method 100 may be implemented for each work function on an off-highway vehicle. For example, in the non-limiting example of the off-highway vehicle 10 of FIG. 1, the boom 16, the arm 18, the bucket 20, the tracks 36, the swing of the cab 12 may each have their own control method with varying levels of operator attention allowing different control capabilities between full manual/automatic operation, reduced manual, augmented, or automatic operation, and disabled operation.

In some non-limiting examples, the control method 100 may be implemented while a task is being performed by the off-highway vehicle 10. For example the off-highway vehicle 10 may be digging and grading with the bucket 20 to achieve a predetermined grade. The controller 40 of the off-highway vehicle 10 may be aware of the task being performed and the predetermined grade. While digging and grading, the controller 40 may utilize automatic operation of the bucket 20 in addition to manual operation by an operator. For example, the automatic operation of the bucket 20 may provide smoothing to the operator's manual input to ensure that the resulting grade is within a predefined tolerance of the predetermined grade. The control method 100 may ensure that automatic output commands are used to control operation of the bucket 20, when necessary, as often as possible (e.g., when the operator attention level is the required level), and that the automatic output commands are reduced or disabled when the operator attention level is less than the required level, which results in a smoother grade, safer operation, and less stress on the operator.

Figure 5:
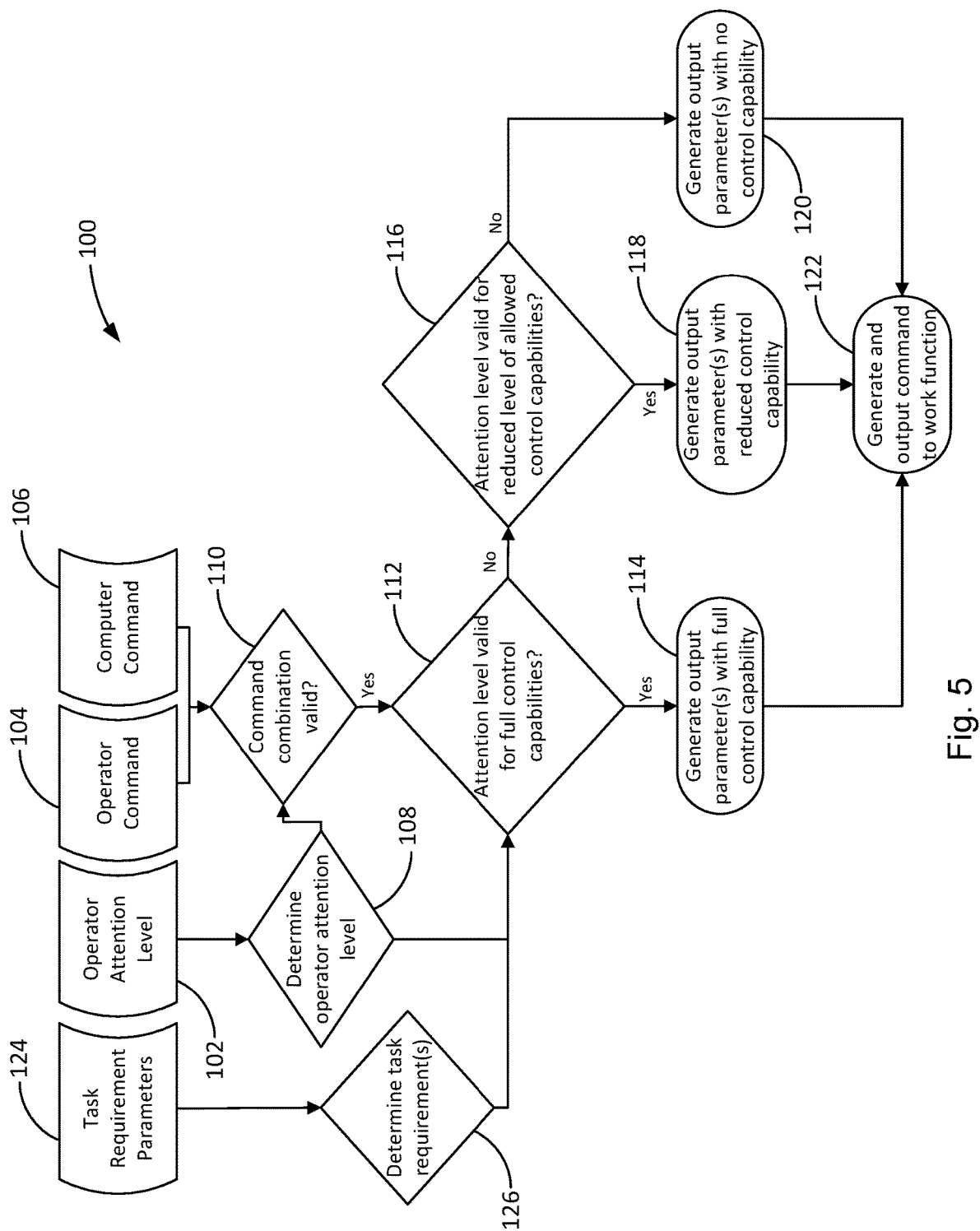
FIG. 5 is a block diagram illustrating the control method of FIG. 3 including a task requirement.

Turning to FIG. 5, in some non-limiting examples, the control method 100 may account for task requirement parameters at block 124. In general, task requirement parameters may be another variable that can vary the allowed control capabilities of an off-highway vehicle. Similar to the operator attention levels, the task requirements may be continuous variables that can be used to generate multi-variable maps that are used to determine the allowed control capabilities for the work functions on an off-highway vehicle. In some non-limiting examples, the task requirement parameters at block 124 may include at least one of the presence of obstacles (e.g., power lines, other vehicles, etc.) in a work area of an off-highway vehicle, the presence people around the off-highway vehicle, e-fencing parameters, and a sensitivity of a task to be performed by the off-highway vehicle. Based on the task requirement parameters provided at block 124, the task requirements associated, with a task being performed by the off-highway vehicle may be determined at block 126.

In some non-limiting examples, the task requirements determined at block 126 may be classified as being greater than or less than a predetermined task requirement level. In some non-limiting examples, the task requirement may include at least one of a precision level and a safety level. In some non-limiting examples, the safety level may include a predetermined safety limit above which the control capabilities of the off-highway vehicle are reduced. Alternatively or additionally, the safety level may incrementally scale the control capabilities of the off-highway vehicle as the value of the safety level changes. In some non limiting examples, the precision level may include a predetermined precision level above which the control capabilities are reduced. Alternatively or additionally, the precision level may incrementally scale the control capabilities of the off-highway vehicle as the value of the precision level changes. In some non-limiting examples, the precision level determined at block 126 may be defined by a flatness required by a grading task.

In some non-limiting examples, the safety level at block 126 may be determined by monitoring a location of the off-highway vehicle and defining zones within which the safety level is increased above the predetermined safety limit (e.g., e-fencing). In some non-limiting examples, the safety level at block 126 may be determined by detecting an obstacle or person adjacent to a work area of the off-highway vehicle, or that the task requires the off-highway vehicle to become close to the obstacle or person, which increases the safety level above the predetermined safety limit.

In general, the task requirement determined a block 126 may alter the control capabilities determined at blocks 112 and 116. For example, by adding additional variables to the maps governing the control method 100, specifically blocks 112 and 116, there may be conditions where the control capabilities were reduced based solely on operator attention level, but may not be reduced, or may not be reduced as much, based on the combination of the task requirement and the operator attention level. Alternatively, there may be conditions where the control capabilities were not reduced based solely on the operator attention level, but may be reduced based on the combination of the task requirement and the operator attention level.

Figure 6:
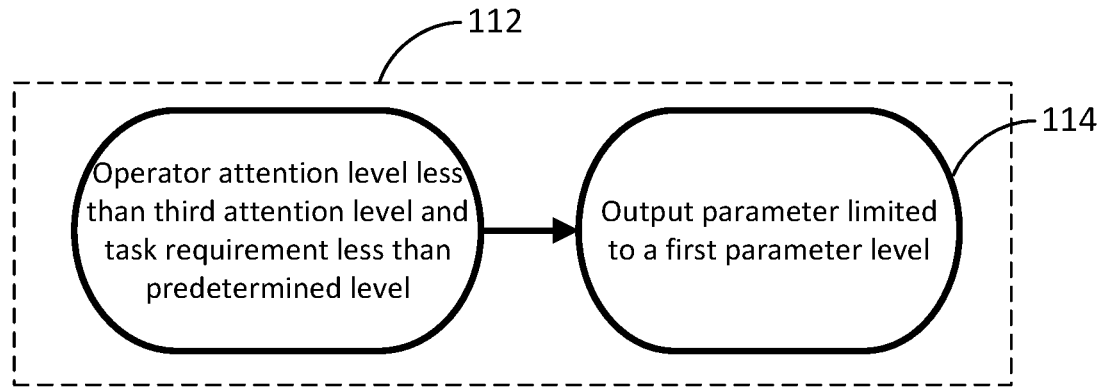
FIG. 6 is a block diagram illustrating various output commands from the control method of FIG. 5.

Turning to FIG. 6, for example, if the determined task requirement at block 126 is less than the predetermined task requirement level and the determined operator attention level at block 108 is less than the third attention level, it may be determined at block 112 that the combination of the determined attention level and the determined task requirement are valid for full control capabilities at block 112. The output command subsequently generated at block 114 may allow full manual operation and full automatic operation, which results in an output command to the work function that is unrestricted.

Figure 7:
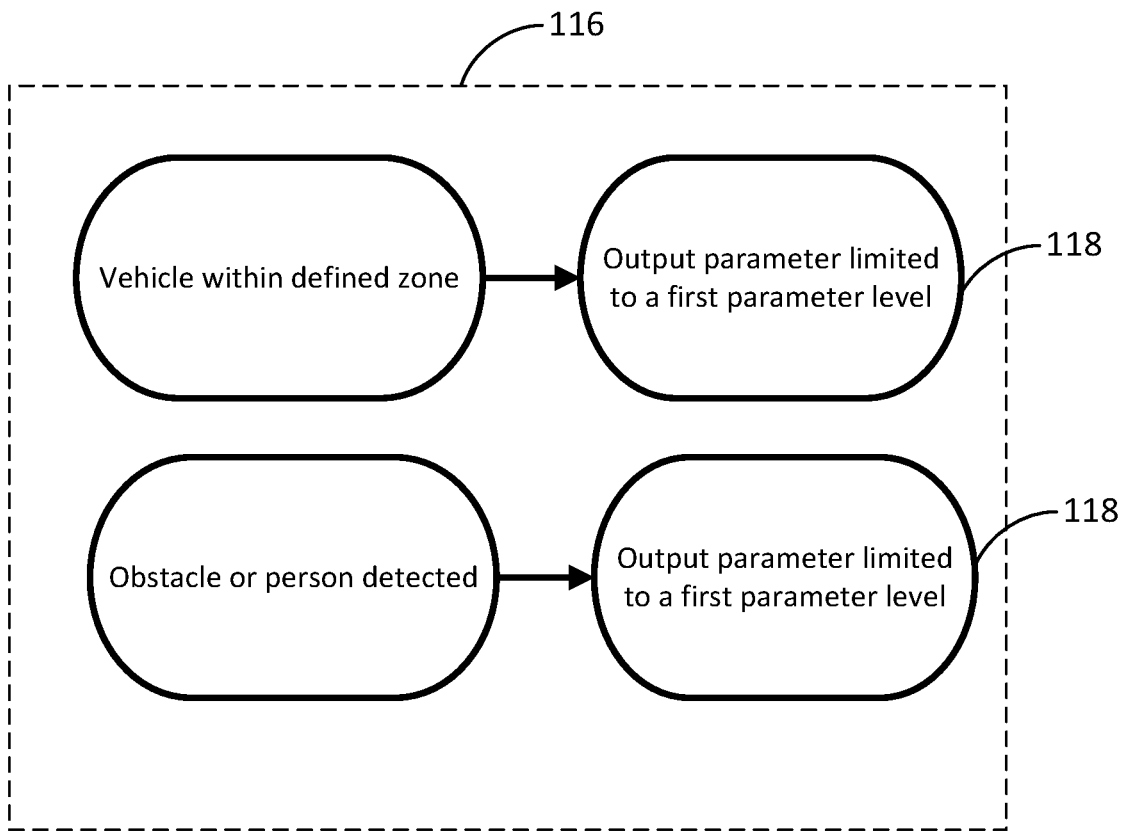
FIG. 7 is a block diagram illustrating further output commands from the control method of FIG. 5.

FIG. 7 illustrates various non-limiting examples of the determination at block 116 for various task requirements, and the corresponding output parameter generated at block 118. In some non-limiting examples, if the task requirement determines that the off-highway vehicle is in one of the defined zones for reduced operation at block 116 the output parameter generated at block 118 may be limited to a first parameter level. In some non-limiting examples, the output parameter generated at block 118 may be limited to the first parameter level, in response to determining that the off-highway vehicle is in one of the defined zones, regardless of the operator attention level. In some non-limiting examples, the output parameter generated at block 118 may be limited to the first parameter level, in response to determining that the off-highway vehicle is in one of the defined zones and that the operator attention level is less than the third attention level, the second attention level, or the first attention level.

In some non-limiting examples, if the task requirement determines that an obstacle or a person is detected adjacent to a work area of the off-highway vehicle. Or that the task requires the off-highway vehicle to become close to the obstacle or person, at block 116, the output parameter generated at block 118 may be limited to a first parameter level. In some non-limiting examples, the output parameter generated at block 118 may be limited to the first parameter level, in response to determining that the off-highway vehicle detects an obstacle or person in the work area, regardless of the operator attention level. In some non-limiting examples, the output parameter generated at block 118 may be limited to the first parameter level, in response to determining that the off-highway vehicle detecting an obstacle or person in the work area and that the operator attention level is less than the third attention level, the second attention level, or the first attention level.

It should be appreciated that the determinations and corresponding output parameters generated in FIGS. 6 and 7 are but a few of the possible outcomes of the control method of FIG. 5. For example, each of the outcomes illustrated in FIG. 3 may be generated, either alone or in combination, for a particular combination of the determined task requirement and the determined operator attention level for a particular work function. In this way, the control method 100 provides efficient and safe control of the operation of the work functions on an off-highway vehicle and effectively manages the ability the work functions to operate in response to both manual commands and automatic commands.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A method of controlling operation of an off-highway vehicle having a first work function, the method comprising:
receiving an input command that includes at least one of a manual input command and an automatic input command;
determining if an operator attention level is at a first attention level, a second attention level, or a third attention level;

generating at least one output parameter based on the determined operator attention level and the input command;

generating an output command based on the at least one output parameter, wherein the at least one output parameter includes at least one of a function speed of the first work function, a range of movement of the first work function, a rate of change of the output command, and a ratio between a manual input command and an automatic input command; and outputting the output command to the first work function to control operation of the first work function based on the output command.

2. The method of claim 1, wherein the at least one output parameter is limited to a first parameter level when the determined operator attention level is less than the third attention level; and wherein the first parameter level limits the output command to be less than or equal to the greater of the input command and the output parameter.

3. The method of claim 2, wherein the at least one output parameter is limited to a second parameter level when the determined operator attention level is less than the second attention level, and wherein the second parameter level is different than the first parameter level.

4. The method of claim 1, wherein the at least one output parameter is the function speed of the first work function, and wherein the function speed is the lesser of a speed defined by the manual input command and a speed defined by the automatic input command.

5. The method of claim 1, wherein the off-highway vehicle includes a second work function and the at least one output parameter further includes an enable/disable function flag, and wherein the enable/disable function flag disables the second work function.

6. The method of claim 1, wherein the output command is limited less than or equal to a first predetermined level based on the at least one output parameter.

7. The method of claim 1, wherein the at least one output parameter includes the range of movement of the first work function and the range of movement is limited to allow one direction of movement when the determined operator attention level is less than the second attention level.

8. The method of claim 1, further comprising determining a task requirement associated with a task being performed by the off-highway vehicle.

9. The method of claim 8, wherein the task requirement includes a safety level that is determined by monitoring a location of the off-highway vehicle and defining zones within which the safety level is increased above a predetermined safety limit; and wherein the at least one output parameter is limited to a first parameter level when the off-highway vehicle is within the defined zones.

10. The method of claim 8, wherein the task requirement includes a safety level that is increased above a predetermined safety limit by detecting an obstacle adjacent to a work area of the off-highway vehicle; and wherein the at least one output parameter is limited to a first parameter level when the safety level is greater than or equal to the predetermined safety limit.

11. A method of controlling operation of an off-highway vehicle having a first work function, the method comprising:

receiving an input command that includes at least one of a manual input command and an automatic input command;

determining if an operator attention level is at a first attention level, a second attention level, or a third attention level;

determining a task requirement associated with a task being performed by the off-highway vehicle, wherein the task requirement includes at least one of a precision level and a safety level;

generating at least one output parameter based on the determined operator attention level, the determined task requirement, and the input command;

generating an output command based on the at least one output parameter, wherein the at least one output parameter includes at least one of a function speed of the first work function, a range of movement of the first work function, a rate of change of the output command, and a ratio between a manual input command and an automatic input command; and outputting the output command to the first work function to control operation of the first work function based on the output command.

12. The method of claim 11, wherein the task requirement includes a safety level that is determined by monitoring a location of the off-highway vehicle and defining zones within which the safety level is increased above a predetermined safety limit; and wherein the at least one output parameter is limited to a first parameter level when the off-highway vehicle is within the defined zones.

13. The method of claim 11, wherein the task requirement includes a safety level that is increased above a predetermined safety limit by detecting an obstacle adjacent to a work area of the off-highway vehicle; and wherein the at least one output parameter is limited to a first parameter level when the safety level is greater than or equal to the predetermined safety limit.

14. The method of claim 11, wherein the at least one output parameter is configured to allow full manual operation and full automatic operation in the output command when the determined operator attention level is less than the third attention level and the determined task requirement is below a predetermined task requirement limit.

15. The method of claim 8, wherein the at least one output parameter is limited to a first parameter level when the determined operator attention level is less than the third attention level; and wherein the first parameter level limits the output command to be less than or equal to the greater of the input command and the output parameter.

16. The method of claim 15, wherein the at least one output parameter is limited to a second parameter level when the determined operator attention level is less than the second attention level, and wherein the second parameter level is different than the first parameter level.

17. The method of claim 11, wherein the at least one output parameter limits the output command to be less than or equal to a first predetermined level above or below the input command.

18. The method of claim 11, wherein the at least one output parameters is the function speed of the first work function, and wherein the function speed the lesser of a speed defined by the manual input command and a speed defined by the automatic input command.

19. The method of claim 11, wherein the off-highway vehicle includes a second work function and the at least one output parameters further includes an enable/disable function flag, and wherein the enable/disable function flag disables the second work function.

20. The method of claim 11, wherein the at least one output parameter includes the range of movement of the first work function and the range of movement is limited to allow one direction of movement when the determined operator attention level is less than the second attention level.

* * * * *

UNITED STATES PATENT AND TRADEMARK OFFICE
CERTIFICATE OF CORRECTION

| | | |
|---|---|---|
| PATENT NO. | : 11,920,326 B2 | Page 1 of 1 |
| APPLICATION NO. | : 17/765363 | |
| DATED | : March 5, 2024 | |
| INVENTOR(S) | : Ben Holter et al. | |

It is certified that error appears in the above-identified patent and that said Letters Patent is hereby corrected as shown below:

In the Specification

Column 4, Line 50, "an" should be --art--.

Column 5, Line 27, "examples, one" should be --examples, the one--.

Column 5, Line 48, "determination block 108 provide" should be --determination at block 108 may provide--.

Column 8, Line 6, "capabilities, lithe" should be --capabilities. If the--.

Column 12, Line 12, "vehicle. Or" should be --vehicle, or--.

Signed and Sealed this
Sixteenth Day of July, 2024

Katherine Kelly Vidal
*Director of the United States Patent and Trademark Office*